United States Patent
Paul et al.

(10) Patent No.: US 11,727,131 B2
(45) Date of Patent: Aug. 15, 2023

(54) REFERENCING A DOCUMENT IN A VIRTUAL SPACE

(71) Applicant: Salesforce, Inc., San Francisco, CA (US)

(72) Inventors: Sohom Paul, Sugar Land, TX (US); Rohan Venapusala, Roseville, CA (US); Michael Brevoort, Littleton, CO (US); Scott Goodfriend, Berkeley, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/565,266

(22) Filed: Dec. 29, 2021

(65) Prior Publication Data

US 2023/0205905 A1    Jun. 29, 2023

(51) Int. Cl.
*G06F 21/62* (2013.01)
*H04L 51/08* (2022.01)

(52) U.S. Cl.
CPC .......... *G06F 21/6209* (2013.01); *H04L 51/08* (2013.01); *G06F 2221/2141* (2013.01); *G06F 2221/2147* (2013.01)

(58) Field of Classification Search
CPC ......... G06F 21/6209; G06F 2221/2141; G06F 2221/2147; G06F 21/10; G06F 21/62; H04L 63/10; H04L 63/101; H04L 2463/101

See application file for complete search history.

(56) References Cited

U.S. PATENT DOCUMENTS

| | | | | |
|---|---|---|---|---|
| 9,961,155 | B1* | 5/2018 | Chan | G06F 21/6218 |
| 10,262,029 | B1* | 4/2019 | Chu | G06Q 30/0269 |
| 10,430,388 | B1* | 10/2019 | Saviano | H04L 67/01 |
| 11,265,183 | B1* | 3/2022 | Iyer | H04L 12/1831 |
| 2009/0193467 | A1* | 7/2009 | Rodriguez | H04N 21/4383 725/47 |
| 2017/0116579 | A1* | 4/2017 | Emejulu | G06Q 10/1095 |
| 2018/0287982 | A1 | 10/2018 | Draeger et al. | |

(Continued)

OTHER PUBLICATIONS

Honh-Yan, Zhu "Design of Digital Media Virtual Display Platform Based on Virtual Reality Technology," 2021 International Conference on Intelligent Transportation, Big Data & Smart City (ICITBS) Year: 2021 | Conference Paper | Publisher: IEEE.*

(Continued)

*Primary Examiner* — Roderick Tolentino
(74) *Attorney, Agent, or Firm* — Lee & Hayes, P.C.

(57) ABSTRACT

In association with a communication platform, one or more users can create, share, edit, and/or comment on a document. Some examples of this disclosure are related to providing a list of suggested documents that a user can reference (e.g., add a link to) in a virtual space (e.g., in a message or post to one or more other users). For example, a user can be interacting with a virtual space (e.g., composing a direct message, a channel post, a thread, a workspace, a document, and the like) and invoke a list of suggested documents that can be referenced in the virtual space. In examples of the present disclosure, the list of suggested documents can include documents that are identified (e.g., based on one or more conditions being met) to be relevant to, or otherwise associated with, the virtual space.

20 Claims, 4 Drawing Sheets

(56) References Cited

U.S. PATENT DOCUMENTS

| | | | | |
|---|---|---|---|---|
| 2020/0301644 | A1* | 9/2020 | Conny Särevall | G09G 5/14 |
| 2021/0357098 | A1* | 11/2021 | Sasaki | G06F 3/017 |
| 2022/0094677 | A1* | 3/2022 | Roy | H04L 65/4015 |
| 2022/0124140 | A1* | 4/2022 | Okina | G06V 40/20 |

OTHER PUBLICATIONS

Pajorova et al., "The Usefulness of the Virtual Speaking Head, as Well as 3D Visualization Tools in the New Presentation Technologies," 2015 19th International Conference on Information Visualisation Year: 2015 | Conference Paper | Publisher: IEEE.*

David Auberbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.

Michael Carney, "Slack is thriving on a cocktail of whimsy and great timing", Pandodaily, LexisNexis, https://advance.lexis.com/api/permalink/dd2d4ee5-2ddf-4d3a-a1d9-3bcee5e38b74/?context=1000516, (dated Feb. 6, 2015, 2:12 AM) 4 pages.

"Die, Email, Die! A Flickr Cofounder Aims To Cut US All Some Slack", Readwriteweb, LexisNexis, https://advance.lexis.com/api/permalink/33dd79e2-90f5-409d-ae27-5a2c7e86bf31/?context=1000516>. (dated Aug. 14, 2 013, 4:15 PM) 3 pages.

Robert Hof, "Stewart Butterfield On How Slack Became A $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.

Matthew Ingram, "Flickr co-founder launches Slack, an all-in-one messaging tool designed to kill email forever", Gigaom, LexisNexis, https://advance.lexis.com/api/permalink/0b676b7c-aec3-4560-861e-d030d1dd008c/?context=1000516, (dated Feb. 12, 2014, 7:03 PM), 3 pages.

Internet Relay Chat, Wikipedia, [online][retrieved May 30, 2019], Retrieved from the Internet: <URL: https://en.wikipedia.org/wiki/Internet_Relay_Chat> (dated May 28, 2019) 21 pages.

Mike Issac, "Slack, a Start-Up With an App to Foster Business Collaboration, Is Valued at $1.1 Billion", The New York Times Blogs (Bits), LexisNexis, https://advance.lexis com/api/permalink/3eb84b34-a8f9Md7d-9573-89d9598a4963/?context=1000516> (dated Oct. 31, 2014) 3 pages.

Adrienne LaFrance, "The Triumph of Email", Atlantic Online, LexisNexis, https://advance.lexis.com/api/permalink/32d7ddd9-d4c1-4a73-86f7-08ab5842fde6/?context=1000516, (dated Jan. 6, 2016) 6 pages.

Matsumoto, T. et al., "Chocoa Communicator—A New Communication System Based on Awareness and Text Communications", FUJITSU Sci. Tech. J., 36, 2, (Dec. 2000) pp. 154-161.

Oikarinen, J. & Reed, D., "Internet Relay Chat Protocol", Request for Comments: 1459, Network Working Group, [online][retrieved May 30, 2019], Retrieved from the Internet: <URL: https://www.rfc-editor.org/rfc/rfc1459.txt>. (dated May 1993) 57 pages.

Ernie Smith, "Picking Up The Slack", Tedium, [online][retrieved May 9, 2019]. Retrieved from the Internet: <URL: https://tedium.co/2017/10/17/irc-vs-slack-chat-history/> (dated Oct. 17, 2017) 8 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.

Jonathan Vanian, "Why these startups think chat apps are the next big thing in workplace collaboration", Gigaom, LexisNexis, https://advance.lexis.com/api/permalink/e83//8c8-09c8-43aa-9ba0-88526283de69/?context=1000516, (dated Aug. 1, 2014, 5:45 PM) 4 pages.

Rebecca Walberg, "Email biggest office waste of time: survey", National Post, At FP10, LexisNexis, https://advance.lexis.com/api/permalink/96268e3f-26ad-48ac-a98f-6c39804ebded/?context=1000516, (dated Mar. 4, 2014) 3 pages.

* cited by examiner

REFERENCING A DOCUMENT IN A VIRTUAL SPACE

TECHNICAL FIELD

A communication platform can leverage a network-based computing system to enable users to exchange data. In an example, users of the communication platform can communicate with other users via channels, direct messages, and/or other virtual spaces. A channel, direct message, and/or other virtual space can be a data route used for exchanging data between and among systems and devices associated with the communication platform. For example, a channel may be established between and among various user computing devices (e.g., clients), allowing the user computing devices to communicate and share data between and among each other over one or more networks. That is, in some examples, the communication platform can be a channel-based platform and/or hub for facilitating communication between and among users. In some examples, data associated with a channel, a direct message, and/or other virtual space can be presented via a user interface. The data can include message objects, such as text, file attachments, emojis, and/or the like that are each posted by individual users of the communication platform. In addition, the data can include documents (e.g., collaborative documents) that may be shared and edited by one or more users.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical components or features. The figures are not drawn to scale.

DETAILED DESCRIPTION

Figure 1:
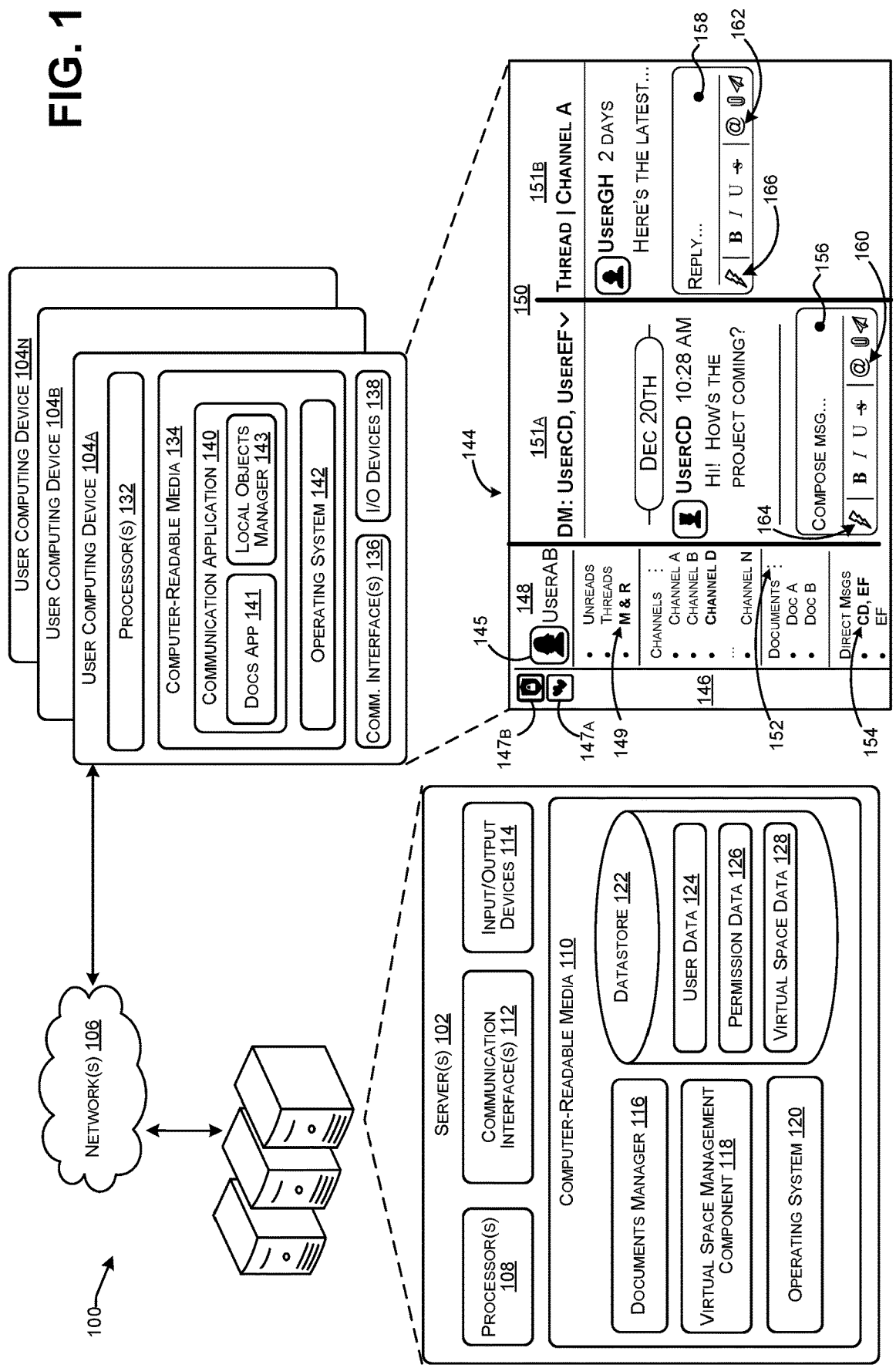
FIG. 1 illustrates an example environment for performing techniques described herein.

As described above, in association with a communication platform, one or more users can create, share, edit, and/or comment on a document. Some examples of this disclosure are related to providing a list of suggested documents that a user can reference (e.g., add a link to) in a virtual space (e.g., in a message or post to one or more other users). For example, a user can be interacting with a virtual space (e.g., composing a direct message, a channel post, a thread, a workspace, a document, and the like) and invoke a list of suggested documents that can be referenced in the virtual space. In examples of the present disclosure, the list of suggested documents can include documents that are identified (e.g., based on one or more conditions being met) to be relevant to, or otherwise associated with, the virtual space. One or more of the documents can be selected for referencing in the virtual space, such as by adding a link to the document. Among other things, examples of the present disclosure improve collaboration and information sharing by surfacing to a user more relevant suggested documents. In addition, examples can improve efficiencies and reduce the use of computing resources by reducing the time and steps spent by a user to search for documents to reference in a virtual space.

In examples of the present disclosure, a document can be created using tools associated with the communication platform. As used herein, a document can include a document form configured to be accessed and/or edited by two or more users (e.g., collaborative document) with appropriate permissions (e.g., viewing permissions, editing permissions, etc.). In some examples, the document can be a virtual space, a board, a canvas, a page, or the like for collaborative communication and/or data organization within the communication platform. In at least one example, a document can support editable text and/or objects that can be ordered, added, deleted, modified, and the like. The document may support various elements, such as, but not limited to, text, symbols, emojis, images, videos, charts, tables, lists, calendar items, spreadsheets, drawings, etc.

In at least one example, a document can be accessible (e.g., with various types of permissions) to multiple users (e.g., multiple user accounts or profiles). For example, in some instances the document may be accessible by one or more users via a link to the document. That is, when a document is created, a link pointing to the document (e.g., on a server or other storage medium) may also be created, and as such, one or more users may access the document (e.g., the same document) by way of the link.

In examples of the present disclosure, when interacting with a virtual space (e.g., composing content associated with the virtual space), a user can invoke a list of one or more suggested documents that are referenceable in the virtual space. The list of suggested documents may be invoked in various manners, such as by selecting an overflow menu, using a special character that indicates a reference to a document, or inputting a keyboard shortcut. In addition, the list of one or more suggested documents may be invoked under various contexts For instance, the list may be invoked when a user is composing a direct message, composing a post or reply in a channel (or other virtual space), commenting in a document, referencing a document, editing/composing content in a document, and the like.

Examples of the present disclosure include identifying documents that are relevant to, or otherwise associated with, the virtual space and that can be surfaced or presented to the user as part of the list of suggested documents. A document associated with a virtual space may be identified using various techniques, such as by identifying one or more attributes associated with a user and/or virtual space, and determining, based on the one or more attributes, whether a condition is satisfied. In examples, the suggested documents may include documents recently interacted with by one or more users of the communications platform, preferred documents (e.g., identified as important or starred by one or more users), documents associated with an active virtual space (e.g., having recent or present engagement by members), documents having content (e.g., keywords) associated with virtual-space content (e.g., tags), documents pinned to or otherwise associated with certain channels, documents associated with particular organizations, groups, or workspaces, and the like.

In some examples, permissions (e.g., in relation to a document) of one or more users may be identified. For example, permissions may be identified when a document is identified for inclusion in a list of suggested documents to be referenced in a virtual space. In addition, permissions may be identified when a document is selected to be referenced in a virtual space. In some examples, techniques of the present disclosure can determine what level of permissions are associated with a user, which has access to the virtual space in which the document is referenced. In addition, examples can present a user-permissions indicator that indicates what level of permission the user has (e.g., no access, viewing only, editing, etc.). For example, if a user that has access to the virtual space does not have access to the document, then the user-permissions indicator may indicate "no access." In addition, examples can present a permissions interface element that, when selected, can affect (e.g., change, update, increase, decrease, etc.) the user's permissions with respect to the document. As such, examples of the present disclosure can allow a first user to determine, based on the user-permissions indicator and when the first user is referencing a document in a virtual space, whether a second user that has access to the virtual space has an appropriate level of permission with respect to the document. Further, the first user can, via the permissions interface element, adjust the permissions associated with the second user at the time the document is referenced.

In some examples, a mechanism that can be used to invoke a list of suggested documents can also be used to invoke other types of objects, such as user accounts, virtual spaces (e.g., direct messages, chats, channels, etc.) lists, calendar items, workflows, and the like. That is, the same mechanism may be used to invoke various different types of object that can be referenced in the virtual space. In some examples, techniques described herein can rank the different types of objects based on a same or different condition, criteria, and/or attribute, and present the list of varied object types in a sorted order. As such, the list of varied object types can include a document interleaved among one or more different object types (e.g., between user accounts in the list or between a user account and some other type of referenceable object type). By ranking the different types of objects, examples of the present disclosure can enable efficient use of a single invoking mechanism (e.g., a keyboard shortcut, such as "@"), instead of needing a different invoking mechanism for the different types of objects. In some examples, a particular symbol may be used to invoke a reference to a document, such as symbol "*".

While techniques described herein are described with reference to documents, techniques can be similarly applicable to any other object that can be referenced in a virtual space. Additional details are described below.

FIG. 1 illustrates an example environment 100 for performing techniques described herein. In at least one example, the example environment 100 can include one or more server computing devices (or "server(s)") 102. In at least one example, the server(s) 102 can include one or more servers or other types of computing devices that can be embodied in any number of ways. For example, in the case of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can be associated with a communication platform that can leverage a network-based computing system to enable users (e.g., user accounts or profiles) of the communication platform to exchange data. In at least one example, the communication platform can be "group-based" such that the platform, and associated systems, channels, message objects, documents, and/or virtual spaces, have security (that can be defined by permissions) to limit access to defined groups of users, such a defined group of users having, for instance, sole access to a given channel, message object, document, and/or virtual space. In some examples, such groups of users can be defined by identifiers, which can be associated with common access credentials, domains, or the like. In some examples, the communication platform can be a hub, offering a secure and private virtual space to enable users to chat, meet, call, collaborate, transfer files or other data, message objects, or otherwise communicate between or among each other, within secure and private virtual spaces, such as channel(s), direct message(s), document(s) (e.g., collaborative document(s)), and/or the like.

In some examples, each group can be associated with an organization, which can be associated with an organization identifier. Users associated with the organization identifier can chat, meet, call, collaborate, transfer files or other data, message, or otherwise communicate between or among each other in a secure and private virtual space available via the communication platform. In some examples, each group can be associated with a workspace, associated with a workspace identifier. Users associated with the workspace identifier can chat, meet, call, collaborate, transfer files or other data, message, or otherwise communicate between or among each other in a secure and private virtual space available via the communication platform. In some examples, a group can be associated with multiple organizations and/or workspaces. In some examples, an organization can be associated with multiple workspaces or a workspace can be associated with multiple organizations.

In at least one example, the server(s) 102 can communicate with one or more user computing devices 104a, 104b, and/or 104n (may also be referred to herein as user computing device(s) 104) via one or more network(s) 106. That is, the server(s) 102 and the user computing device(s) 104 can transmit, receive, and/or store data (e.g., content, message objects, data, or the like) using the network(s) 106, as described herein. In some examples, the user computing device(s) 104 can comprise a "client" associated with a user. The user computing device(s) 104 can be any suitable type of computing device, e.g., portable, semi-portable, semi-stationary, or stationary. Some examples of the user computing device(s) 104 can include a tablet computing device, a smart phone, a mobile communication device, a laptop, a netbook, a desktop computing device, a terminal computing device, a wearable computing device, an augmented reality device, an Internet of Things (IOT) device, or any other computing device capable of sending communications and performing the functions according to the techniques described herein. In practice, the example environment 100 can include one user computing device or multiple (e.g., tens of, hundreds of, thousands of, millions of) user computing devices. In at least one example, user computing device(s) 104 can be operable by users to, among other things, access communication services via the communication platform. A user can be an individual, a group of individuals, an employer, an enterprise, an organization, or the like. In some examples, users can be associated with designated roles (e.g., based at least in part on an organization chart) and/or types (e.g., administrator, verified, etc.).

The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 106 are well known and are not discussed herein in detail.

In at least one example, the server(s) 102 can include one or more processors 108, computer-readable media 110, one or more communication interfaces 112, and input/output devices 114.

In at least one example, each processor of the processor(s) 108 can be a single processing unit or multiple processing units, and can include single or multiple computing units or multiple processing cores. The processor(s) 108 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 108 can be one or more hardware processors and/or logic circuits of any suitable type specifically programmed or configured to execute the algorithms and processes described herein. The processor(s) 108 can be configured to fetch and execute computer-readable instructions stored in the computer-readable media, which can program the processor(s) to perform the functions described herein.

The computer-readable media 110 can include volatile, nonvolatile, removable, and/or non-removable memory or other media implemented in any type of technology for storage of data, such as computer-readable instructions, message objects, program modules, or other data. Such computer-readable media 110 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 110 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 110 can be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102. Functional components stored in the computer-readable media can optionally include a documents manager 116, a virtual space (VS) management component 118, an operating system 120, and a datastore 122.

In examples of the present disclosure, the documents manager 116 facilitates storage (e.g., in the datastore 122) of documents (and information associated with documents) created and edited by the user computing device(s) 104. Examples of documents may include a document (e.g., collaborative document) configured to be accessed and/or edited by the user computing device(s) 104. In some examples, the document can be a virtual space, a board, a canvas, a page, or the like for collaborative communication and/or data organization within the communication platform. In at least one example, a document can support editable text and/or objects that can be ordered, added, deleted, modified, and the like. The document may support various elements, such as, but not limited to, text, symbols, emojis, comments, images, videos, audio, applications, macros, charts, tables, lists, calendar items, spreadsheets, drawings, etc.

In at least some examples, the documents manager 116 can maintain a primary version of a document and can provide access to the primary version. For example, a link to the primary version may be provided to the user computing device(s) 104, which can download an instance or copy of the primary version for viewing, editing, sharing, and the like. In examples, the documents manager 116 can track information associated with the document, such as a log of one or more users that created the document and/or that have received the link to the document (e.g., or otherwise had the document shared). In addition, the documents manager 116 can track permissions associated with the document, such as user-specific permission, virtual-space specific permissions, organizational permissions, and/or any other permissions indicating whether a user (or group of users) can view, edit, share, and/or perform any interaction with respect to the document.

The documents manager 116 can maintain various other information associated with a document. For example, the documents manager 116 can store any associations of the document with one or more users (e.g., users tagged in the doc via "@" or other mentioning techniques) or with one or more virtual spaces (e.g., a channel with which the document is associated). In addition, the documents manager 116 can facilitate collaboration between users (e.g., via the user computing device(s) 104) with respect to a document. That is, multiple users may download a respective instance of a document and simultaneously interact (e.g., via respective document user interfaces) with the document and/or with one another. As such, the documents manager 116 can coordinate simultaneous interactions of multiple users with respect to the document, such as by facilitating viewing across the user computing device(s) and reconciling edits, comments, or other changes with respect to the document.

In examples of the present disclosure, the documents manager 116 can determine user presence information indicating one or more interactions of one or more users with a document. For example, the documents manager 116 can maintain a log tracking an identity associated with any user that is presently interacting (e.g., viewing, editing, etc.) with a document. In some examples, the documents manager 116 may request and/or receive updates related to any such interactions from the user computing device(s), such as whether the user account is viewing or editing a document (e.g., an instance of the document) or whether the document is in a foreground of a user interface. In some examples, the documents manager 116 can determine information associated with any user interacting with a document. For example, the documents manager 116 can determine permissions of the user with respect to the document, whether the user is a member of a virtual space associated with the document. In some examples, the documents manager 116 can track historical and/or present traffic/engagement (e.g., user viewing, editing, sharing, commenting, etc.) associated with a document, which may be used to determine an activity level associated with the document. In some instances, the activity level may be used to infer a relative importance or relevance of a document, such as where a higher present or recent activity level (e.g., higher than historical activity or higher than other documents) suggests that a document may be more relevant or more important.

In at least some examples of the present disclosure, information tracked by the documents manager 116 can be provided to the user computing device(s) 104 to indicate presence information, activity-level information, preferred-status information (e.g., when one or more users have starred a document or otherwise indicated higher importance), etc. associated with a document, such as which users are presently interacting with the document and any additional information associated with those presently interacting users. For example, the information may be pushed (e.g., via notifications) from the server(s) to the user computing device(s) 104 (e.g., a notification can be pushed when presence information is updated). In some examples, the presence information may be provided in response to a query from the user computing device(s) 104.

In at least one example, the VS management component 118 can manage channels of the communication platform. In at least one example, the communication platform can be "channel-based" such that the platform can be organized into channels having security (that can be defined by permissions) to limit access to defined groups of users (e.g., members of the channels). A channel, or virtual space, can be a data route used for exchanging data between and among systems and devices associated with the communication platform such as, for example, content and/or message objects. In some examples, a channel may be "public," which may allow any user within a group (e.g., associated with an organization identifier, associated with a workspace identifier, etc.) with which the channel is associated to join and participate in the data sharing through the channel. In some examples, a channel may be "private," which may restrict data communications in the channel to certain users or users having particular roles (e.g., managers, administrators, etc.) and/or types (e.g., verified, administrator, etc.). In some examples, a channel may be an "announcement" channel, which may restrict communication in the channel to announcements or may otherwise be associated with announcements instead of other more granular topics of other channels.

In at least one example, a channel can be associated with a defined group of users within the same organization. Such a channel can be an "internal channel" or an "internally shared channel." In some examples, a channel may be "shared" or "externally shared," which may allow users associated with two or more different groups (e.g., entities associated with two or more different organization and/or workspace identifiers) to join and participate in the data sharing through the channel. A shared channel may be public such that it is accessible to any user of groups associated with the shared channel, or may be private such that it is restricted to access by certain users or users having particular roles and/or types. A "shared channel" or an "externally shared channel" can enable two or more organizations, such as a first organization and a second organization to share data, exchange communications, and the like (hence, a "shared" channel or an "externally shared channel" can refer to a channel which is accessible across different organizations, whereas an "internal channel" can refer to a communication channel which is accessible within a same organization). In an example, the first organization and the second organization can be associated with different organization identifiers, can be associated with different business entities, have different tax identification numbers, and/or otherwise can be associated with different permissions such that users associated with the first organization and users associated with the second organization are not able to access data associated with the other organization, without the establishment of an externally shared channel. In some examples, a shared channel can be shared with one or more different workspaces and/or organizations that, without having a shared channel, would not otherwise have access to each other's data by the nature of the permission-based and/or group-based configuration of the communication platform described herein.

In at least one example, the VS management component 118 can receive a request to generate a channel. In some examples, the request can include a name that is to be associated with the channel, one or more users to invite to join the channel, and/or permissions associated with the channel. In at least one example, one or more user identifiers associated with one or more users and/or one or more user accounts can be mapped to, or otherwise associated with, a channel (e.g., a channel identifier associated therewith). User(s) associated with a channel can be "members" of the channel. Members of a channel can communicate with other members via the channel. That is, in at least one example, the VS management component 118 can establish a channel between and among various user computing devices associated with user identifiers associated with the channel, allowing the user computing devices to communicate and share data between and among each other. As described herein, in some examples, such communication and/or sharing of data can be via one or more messages (posted directly by a user or suggested for publication in association with a user account of the user) that can be exchanged via a channel. In at least one example, the VS management component 118 can manage such communications and/or sharing of data. In some examples, data associated with a channel can be presented via a user interface.

As described above, in at least one example, one or more permissions can be mapped to, or otherwise associated with, a channel and/or members associated therewith. Such permission(s) can indicate which user(s) have permission to access the channel, actions, messages and/or other objects associated with the channel, which user(s) and/or type(s) of users are permitted to add or remove members, which user(s) and/or types of users are permitted to share the channel with other users, a retention policy associated with data in the channel, whether the channel is public or private, or the like.

In at least one example, the VS management component 118 can manage "direct messages," which can comprise communications with individual users or multiple specified users (e.g., instead of all, or a subset of, members of an organization). In at least one example, a "direct message" can comprise a data route, or virtual space, used for exchanging data between and among systems and devices associated with the communication platform (e.g., content and/or message objects). In some examples, a direct message can be a private message object between two or more users of the communication platform. In some examples, a direct message can be "shared," which may allow users associated with two or more different groups (e.g., entities associated with two or more different organization and/or workspace identifiers) to join and participate in the data sharing through the direct message.

In at least one example, the VS management component 118 can receive a request to generate a direct message or multi-person direct message(s). In some examples, the request can include identifiers associated with one or more users that are intended recipient(s) (e.g., recipient user(s)) of the direct message. In at least one example, one or more user identifiers associated with one or more users and/or one or more user accounts can be mapped to, or otherwise associated with, a direct message (e.g., or direct message identifier associated therewith). User(s) associated with a direct message can communicate with one another and/or otherwise share data with one another via the direct message. As described herein, in some examples, such communication and/or sharing of data can be via one or more message objects that can be exchanged via the direct message. In at least one example, the VS management component 118 can manage such communications and/or sharing of data. In some examples, data associated with a direct message can be presented via a user interface.

Additionally, in some examples, the VS management component 118 can be configured to associate a virtual space with a document. That is, a document can be created and shared as part of data shared to members of the virtual space. In some examples, the permissions associated with the virtual space can be attributed to the document as well. For example, if a virtual space is private, then a document associated with the private channel may be discoverable (e.g., via searching and/or a file browser) and may be viewable only by members of the channel. In some examples, if a virtual space is public, then the document may be discoverable and viewable by any member of the organization or workspace with which the virtual space is associated. In some examples, a document may have a different set of permissions associated with the document than the permissions of a channel that the document is associated with (e.g., a document may be shared with users who are not associated with a channel).

In at least one example, the operating system 120 can manage the processor(s) 108, computer-readable media 110, hardware, software, etc. of the server(s) 102.

In at least one example, the datastore 122 can be configured to store data that is accessible, manageable, and updatable. In some examples, the datastore 122 can be integrated with the server(s) 102, as shown in FIG. 1. In other examples, the datastore 122 can be located remotely from the server(s) 102 and can be accessible to the server(s) 102 and/or user device(s), such as the user device 104. The datastore 122 can comprise one or multiple databases, which can include user data 124, permission data 126, and virtual space (VS) data 128. Additional or alternative data can be stored in the datastore and/or one or more other datastores.

In at least one example, the user data 124 can store data associated with users of the communication platform. In at least one example, the user data 124 can store data in user profiles (which can also be referred to as "user accounts"). In some examples, a user can be associated with a single user profile. In some examples, a user can be associated with multiple user profiles. A user profile can store data associated with a user, including, but not limited to, one or more user identifiers associated with multiple, different organizations, groups, or entities with which the user is associated, one or more group identifiers for groups (or, organizations, teams, entities, or the like) with which the user is associated, one or more channel identifiers associated with channels to which the user has been granted access, an indication whether the user is an owner or manager of any channels, an indication whether the user has any channel restrictions, one or more direct message identifiers associated with direct messages with which the user is associated, one or more document identifiers associated with collaborative and/or personal documents with which the user is associated, a plurality of message objects, a plurality of emojis, a plurality of conversations, a plurality of conversation topics, an avatar, an email address, a real name (e.g., John Doe), a username (e.g., j doe), a password, a time zone, a status, and the like.

In some examples, the user data 124 can store indications of user preferences, which can be explicitly indicated or learned. In some examples, the user data 124 of a user can indicate a role or position of a user, which can be determined based at least in part on an organizational chart and/or learned. In some examples, the communication platform can analyze messaging and/or other interaction data to determine relationships between users and/or relative ranks and can infer organizational charts. In some examples, the user data 124 of a user can indicate a user type of the user, for example, whether the user is an administrator, a verified user, and/or the like. In at least one example, user type can be a designation provided by the communication platform (e.g., wherein roles can be designated by organizations, workspaces, teams, and/or other groups). In some examples, the communication platform can store indications of which users and/or virtual spaces a user communicates with and/or in, a frequency of such communication, topics associated with such communications, reactions and/or feedback associated with such communications and/or the like.

In at least one example, the permission data 126 can store data associated with permissions of individual users of the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with an individual user can be mapped to, or otherwise associated with, a profile and/or account associated with the user data 124. In some examples, permissions can indicate which users can communicate directly with other users, which channels a user is permitted to access, restrictions on individual channels, which workspaces the user is permitted to access, restrictions on individual workspaces, and the like. In at least one example, the permissions can support the communication platform by maintaining security for limiting access to a defined group of users. In some examples, such users can be defined by common access credentials, group identifiers, or the like, as described above.

In some examples, the permission data 126 can store data associated with permissions of groups associated with the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with a group can be mapped to, or otherwise associated with, data associated with the group. In some examples, permissions can indicate restrictions on individual groups, restrictions on channel(s) associated with individual groups, restrictions on user(s) associated with individual groups, and the like. In at least one example, the permissions can support the communication platform by maintaining security for limiting access to a defined group of users. In some examples, such groups can be defined by common access credentials, group identifiers, or the like, as described above.

In some examples, the permission data 126 can store data associated with permissions of individual channels. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with a channel can be mapped to, or otherwise associated with, data associated with the channel in the VS data 128. In some examples, permissions can indicate restrictions on individual channels, restrictions on user(s) associated with individual channels, and the like.

In some examples, the permission data 126 can store data associated with permissions of individual message objects, documents, or other objects. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user (e.g., the originator of the message object, document, etc.), or the like. In some examples, permissions associated with a message object, document, or other object can be mapped to, or otherwise associated with, data associated with the message object or other object. In some examples, permissions can indicate viewing permissions, access permissions, editing permissions, etc.

In at least one example, the VS data 128 can store data associated with individual channels, direct messaging instances, communication instances (e.g., associated with collaborative editing sessions), collaborative documents (e.g., documents shared by two or more users), audio and/or video communications, and/or the like. In at least one example, the VS management component 118 can establish a virtual space between and among various user computing devices, allowing the user computing devices to communicate and share data between and among each other. In at least one example, a virtual space identifier can be assigned to a virtual space (e.g., channel, direct message instance, board, collaborative document, audio or video communication, etc.), which indicates the physical address in the VS data 128 where data related to that virtual space is stored. In some examples, individual messages, documents, or other objects posted to a virtual space can be stored in association with the VS data 128. In some examples, a collaborative document may be configured as its own virtual space (e.g., an information container via which users can exchange information in various forms, such as text, symbols, emojis, images, videos, charts, tables, lists, calendar items, spreadsheets, drawings, etc.).

As described above, documents posted, or otherwise sent and/or received, via channels, direct messages, collaborative documents, etc. can be stored in association with the VS data 128. In some examples, such documents can additionally or alternatively be stored in association with the user data 124. In some examples, document data can be stored separately from the user data 124 and the VS data 128. Document data can include various information. For example, document data stored in the datastore 122 can include content of the document, such as text, symbols, emojis, images, videos, charts, tables, lists, calendar items, spreadsheets, drawings, etc.). In addition, document data can include permissions associated with the document, including permissions associated with viewing, sharing, editing, etc. Document data can also include file properties associated with the document. In some examples, document data may include an indication of one or more virtual spaces (e.g., channels) associated with the document. In addition, document data may include presence information indicating one or more users presently interacting with the document. The presence information may identify a user (e.g., user account). In some examples, the presence information may indicate a manner in which the user is presently interacting with the document, such as by presently viewing, editing, having open in a background, etc. In some examples, the presence information may indicate (or be used to determine) various other attributes associated with the user, such as permissions of the user with respect to the document and/or whether the user is a member of a virtual space associated with the document.

The datastore 122 can store additional or alternative types of data, which can include, but is not limited to communication data (e.g., data shared in an ephemeral communication instance between at least two users), interaction data (e.g., data associated with additional or alternative interactions with the communication platform), model(s), etc.

In some examples, the datastore 122 can be partitioned into discrete items of data that can be accessed and managed individually (e.g., data shards). Data shards can simplify many technical tasks, such as data retention, unfurling (e.g., detecting that message object contents include a link, crawling the link's metadata, and determining a uniform summary of the metadata), and integration settings. In some examples, data shards can be associated with groups (e.g., organizations, workspaces), channels, direct messages, users, documents (e.g., shared documents), or the like.

In some examples, at least partially in response to a document being referenced (and/or at least partially in response to some interaction with the document being referenced (e.g., hovering a cursor over a document reference), an unfurl operation may show a preview (e.g., a thumbnail) of at least at portion of the document referenced. In some examples, the unfurl operation may be based at least in part on one or more permissions associated with the document or the user accessing or otherwise interacting with the document being referenced or the document comprising the reference. In some examples, the unfurl operation, being based on one or more permissions, may alter or vary a type of content being presented, a size of content being presented, a level of access for the content to be previewed (e.g., read only, read/write access, share access, etc.), a location of content being presented, whether the preview indicates users having access to the previewed document, and the like, based on the user permissions. Further, in some examples, the reference can be directed to a particular document, a plurality of documents, a section of a document, task(s) associated with a document (or object), an object in a document, an application, a channel, and the like. In some examples, a user with first permissions (e.g., full access) can be presented with one unfurled view, while another user with second permissions (e.g., partial access) can be presented with a difference unfurled view.

In some examples, individual groups can be associated with a database shard within the datastore 122 that stores data related to a particular group identification. For example, a database shard can store electronic communication data associated with members of a particular group, which enables members of that particular group to communicate and exchange data with other members of the same group in real time or near-real time. In this example, the group itself can be the owner of the database shard and has control over where and how the related data is stored and/or accessed. In some examples, a database shard can store data related to two or more groups (e.g., as in a shared channel, such as an externally shared channel).

In some examples, a channel can be associated with a database shard within the datastore 122 that stores data related to a particular channel identification. For example, a database shard can store electronic communication data associated with the channel, which enables members of that particular channel to communicate and exchange data with other members of the same channel in real time or near-real time. In this example, a group or organization can be the owner of the database shard and can control where and how the related data is stored and/or accessed.

In some examples, a direct message can be associated with a database shard within the datastore 122 that stores data related to a particular direct message identification. For example, a database shard may store electronic communication data associated with the direct message, which enables a user associated with a particular direct message to communicate and exchange data with other users associated with the same direct message in real time or near-real time. In this example, a group or organization can be the owner of the database shard and can control where and how the related data is stored and/or accessed.

In some examples, a document can be associated with a database shard within the datastore 122 that stores data related to a particular document. For example, a database shard may store the document, additional data, edits made to the document, electronic communication data associated with a communication instance corresponding to the document, and presence information, which enables users collaboratively editing a document to communicate and exchange data in real-time or near real-time. In this example, a group or organization (e.g., of the suggesting user or of the recipient user) can be the owner of the database shard and can control where and how the related data is stored and accessed.

In some examples, individual users can be associated with a database shard within the datastore 122 that stores data related to a particular user account. For example, a database shard may store electronic communication data associated with an individual user, which enables the user to communicate and exchange data with other users of the communication platform in real time or near-real time. In some examples, the user itself can be the owner of the database shard and has control over where and how the related data is stored and/or accessed.

The communication interface(s) 112 can include one or more interfaces and hardware components for enabling communication with various other devices (e.g., the user computing device 104), such as over the network(s) 106 or directly. In some examples, the communication interface(s) 112 can facilitate communication via Web Sockets, Application Programming Interfaces (APIs) (e.g., using API calls), Hyper Text Transfer Protocols (HTTPs), etc.

The server(s) 102 can further be equipped with various input/output devices 114 (e.g., I/O devices). Such I/O devices 114 can include a display, various user interface controls (e.g., buttons, joystick, keyboard, mouse, touch screen, etc.), audio speakers, connection ports and so forth.

In at least one example, the user computing device(s) 104, such as the user computing device 102a, can include one or more processors 132, computer-readable media 134, one or more communication interfaces 136, and input/output devices 138. In at least one example, the user computing device(s) 104 can correspond to a "client" of a user. In some examples, the user computing device 104 can be associated with multiple "clients," in which case, each instance of an application or other access point can be its own client. For example, a user can be signed into a first client (e.g., the application 140) and a second client (e.g., a web browser), both of which can be associated with the user computing device 104. In another example, the user can be signed into a first client (e.g., the application 140) and a second client, each of which can be on separate user computing devices.

In at least one example, each processor of the processor(s) 132 can be a single processing unit or multiple processing units, and can include single or multiple computing units or multiple processing cores. The processor(s) 132 can comprise any of the types of processors described above with reference to the processor(s) 108 and can be the same as or different from the processor(s) 108.

The computer-readable media 134 can comprise any of the types of computer-readable media 134 described above with reference to the computer-readable media 110 and can be the same as or different from the computer-readable media 110. Functional components stored in the computer-readable media can optionally include at least one application 140 and an operating system 142.

In at least one example, the application 140 can be a mobile application, a web application, or a desktop application, which can be provided by the communication platform or which can be an otherwise dedicated application. In at least one example, the application 140 can be a native application associated with the communication platform. In some examples, individual user computing devices associated with the environment 100 can have an instance or versioned instance of the application 140, which can be downloaded from an application store, accessible via the Internet, or otherwise executable by the processor(s) 132 to perform operations as described herein. That is, the application 140 can be an access point, enabling the user computing device 104 to interact with the server(s) 102 to access and/or use communication services available via the communication platform. In at least one example, the application 140 can facilitate the exchange of data between and among various other user computing devices, for example via the server(s) 102. In at least one example, the application 140 can present user interfaces, as described herein. In at least one example, a user can interact with the user interfaces via touch input, keyboard input, mouse input, spoken input, or any other type of input. Additional or alternative access points, such as a web browser, can be used to enable the user computing device 104 to interact with the server(s) 102 as described herein. That is, in examples where the application 140 is described as performing an operation below, in an additional or alternative example, such an operation can be performed by another access point, such as a web browser or the like.

The communication application 140 may include various functional components, and in at least one example, the application 140 includes a documents application 141 (e.g., "Docs App 141") and a local objects manager 143. In some examples, the documents application 141 may perform one or more operations enabling a user to perform various document-related functions, such as viewing, editing, and/or commenting on a document, such as via the one or more user interfaces described herein. In some examples, the documents application 141 may exchange information with the documents manager 116. For example, the documents application 141 may log (e.g., store locally), and provide to the documents manager 116, information indicating a user is interacting with a document (e.g., viewing, editing, commenting, etc.), a user prefers the document (e.g., via starred status or other importance identifier, a time when the user last interacted with a document, and the like. In some examples, the documents application 141 may store tags, keywords, permissions, etc. associated with a document. In some examples, the documents manager 116 may communicate to the documents application 141 presence information indicating any interactions of other users (e.g., users of the user computing device 104b and/or 104n) with a document.

The local objects manager 143 can perform one or more various operations related to a variety of different types of local objects, such as documents, virtual spaces (e.g., channels, direct messages, workspaces, etc.), lists, workflows, user accounts, and the like. For example, the local objects manager 143 can store local objects (e.g., cache) or local links to objects, such as a compilation of one or more different types of local objects. In addition, the local objects manager 143 can store information that is associated with the local objects and that can be used to identify, rank, sort, and/or filter the local objects.

A non-limiting example of a user interface 144 is shown in FIG. 1. The user interface 144 may present information associated with a user account (e.g., "UserAB" as indicated by the user profile indicator 145). As illustrated in FIG. 1, the user interface 144 can present data associated with one or more channels, documents, and/or, in some examples, one or more workspaces. That is, in some examples, the user interface 144 can enable a user to access multiple workspaces. In some examples, the user interface 144 can include a first section 146 (e.g., which can be a portion, pane, or other partitioned unit of the user interface 144) that includes user interface element(s) associated with workspace(s) with which the user (e.g., account of the user) is associated. Two user interface elements are illustrated in FIG. 1, including a first user interface element 147a representing a first workspace and a second user interface element 147b representing a second workspace. As described above, such workspaces can be associated with different domains. In some examples, a user can interact with the first user interface element 147a or the second user interface element 147b to access the corresponding workspace. In some examples, a user can be prompted to provide a credential to authenticate with the corresponding workspace. While two user interface elements 147a and 147b are illustrated, any number of user interface elements can be presented via the first section 146, which can be associated with one or more domains.

In some examples, the user interface 144 may include a second section 148 (e.g., which can be a portion, pane, or other partitioned unit of the user interface 144) that includes user interface element(s) representing data associated with the workspace(s) with which the user (e.g., account of the user) is associated. In some examples, user interface element(s) presented via the second section 148 can represent virtual space(s) with which the user has access via a particular workspace or multiple workspaces. In some examples, the second section 148 may include user interface elements that allow the user to take additional action with respect to virtual spaces. For example, by selecting one of the channel identifiers in the section 148, a user may be able to view (via the user interface 144 and in the section 150) contents associated with the selected channel. Similarly, by selecting one of the document identifiers in the section 148, a user may be able to view (e.g., in section 150) contents associated with the selected document. In some examples, the second section 148 may include a menu extension indicator 152 that, when selected, causes a pop-up or overlay menu to be presented, which may present selectable links that, when selected by a user, facilitates a corresponding function, such as controlling the listing of documents in the second section 148, creating a new document, or browsing documents associated with the selected workspace (e.g., presenting all documents accessible to the user). Further, by selecting one of the direct message identifiers 154 in the section 148, a user may be able to view (e.g., in section 150) contents associated with the selected direct message and send a direct message to the one or more users associated with the selected direct message.

In at least one example, the user interface 144 can include the third section 150 (e.g., which can be a portion, pane, or other partitioned unit of the user interface 144) that can be associated with a data feed (or "feed") indicating messages posted to and/or actions taken with respect to one or more channels, documents, and/or other virtual spaces for facilitating communications (e.g., a virtual space associated with direct message communication(s), a virtual space associated with event(s) and/or action(s), etc.) as described herein. In at least one example, data associated with the third section 150 can include (e.g., when "browse" is selected from an interface element in section 148) a listing of documents, channels, or other objects to which the user has access. In at least one example, data associated with the third section 150 can be associated with the same or different workspaces. That is, in some examples, the third section 150 can present data associated with the same or different workspaces via an integrated feed. In some examples, the data can be organized and/or is sortable by workspace, time (e.g., when associated data is posted or an associated operation is otherwise performed), type of action, channel, user, or the like. In some examples, such data can be associated with an indication of which user (e.g., member of the channel) posted the message and/or performed an action. In examples where the third section 150 presents data associated with multiple workspaces, at least some data can be associated with an indication of which workspace the data is associated with. In some examples, the third section 150 may present data associated with an item selected from the second section 148, such as a channel, document, or direct message.

In some examples, the third section 150 can be divided into sub-sections 151a and 151b, which can present information associated with one or more objects associated with the user account. For example, sub-section 151a can present information associated with an object (e.g., channel, shared channel, document, direct message, etc.) selected from the section 148, and sub-section 151b can present content associated with a thread of messages associated with a channel. These are just examples, and the sub-sections 151a and 151b may, in other instances, present information (or user interfaces) associated with other objects (e.g., direct messages, multi-person direct messages, workspaces, browser lists, profile information, documents, applications, etc.). In some examples, the third section 150 may not be sub-divided into sub-sections and can include a single section or pane.

In some examples, the third section 150 (e.g., including the sub-sections 151a and 151b) can include one or more composition interface elements 156 and 158 in which a document can be referenced. For example, in interface element 156, a document may be referenced in a message to the selected direct message virtual space (e.g., associated with UserCD and UserEF), and in interface element 158, a document may be referenced in a message/reply to the thread linked to Channel A. That is, when composing a message as part of the direct message associated with UserBC and UserDE, the UserAB may want to reference a document (e.g., by including a link to the document in the message). As such, based on techniques described herein, the UserAB can invoke a list of suggested documents and select or otherwise indicate, from the list, a document to be referenced in the message. Similarly, when composing a message as part of the thread reply associated with Channel A, the UserAB may want to reference a document (e.g., by including a link to the document in the message). As such, based on techniques described herein, the UserAB can invoke a list of suggested documents and select, from the list, a document to be referenced in the reply. These are examples, and in other instances, in the section 150 or in the sub-sections 151*a* and/or 151*b*, a document may be referenced in other types of virtual spaces, such as a channel post, document, a synchronous audio call, workspace, and the like.

A list of suggested documents may be invoked in various manners. In some examples, a user may invoke a list of suggested documents via a keyboard shortcut or a predetermined document reference symbol, such as by typing "@" in the interface element 156 or 158. In some examples, a user may invoke a list of suggested documents by selecting the @ interface element 160 or 162. In some examples, a predetermined document reference symbol such as "*" may be used. In addition, in some examples, a user may invoke a list of suggested documents via a shortcuts interface element 164 or 166. As described in other portions of this disclosure, in examples, a user may select a document from the list of suggested documents, and based on the selection, a link to the document may be added to the user interface 156 or 158 for inclusion in the message (e.g., to reference the document in the message). Additional details associated with the user interface 144, and invoking a list of suggested documents, are described below with reference to FIG. 2.

In examples of the present disclosure, the list of suggested documents can include documents associated with the virtual space in which the document is being added, associated with the user adding the document, associated with one or more users associated with the virtual space (e.g., DM recipients or other members of a virtual space), and/or documents that are otherwise relevant to the virtual space or the user(s). For example, when the user (e.g., UserAB in FIG. 1) invokes a list of suggested documents (e.g., keyboard shortcut or user interface elements 160, 162, 164, or 166), the documents application 141 can identify a list of suggested documents based on one or more attributes associated with the user and/or virtual space satisfying a condition. In some examples, the documents application 141 can reference a list of local objects (e.g., all local objects maintained by the local objects manager 143) and identify the list of suggested documents from the list of local objects.

In at least one example, the operating system 142 can manage the processor(s) 132, computer-readable media 134, hardware, software, etc. of the user computing device(s) 104.

The communication interface(s) 136 can include one or more interfaces and hardware components for enabling communication with various other devices (e.g., the user computing device(s) 104), such as over the network(s) 106 or directly. In some examples, the communication interface(s) 136 can facilitate communication via Web Sockets, APIs (e.g., using API calls), HTTPs, etc.

The user computing device(s) 104 can further be equipped with various input/output devices 138 (e.g., I/O devices). Such I/O devices 138 can include a display, various user interface controls (e.g., buttons, joystick, keyboard, mouse, touch screen, etc.), audio speakers, microphones, cameras, connection ports and so forth.

While techniques described herein are described as being performed by the documents manager 116, the VS management component 118, the application 140, and/or the documents application, techniques described herein can be performed by any other component, or combination of components, which can be associated with the server(s) 102, the user computing device(s) 104, or a combination thereof.

Figure 2:
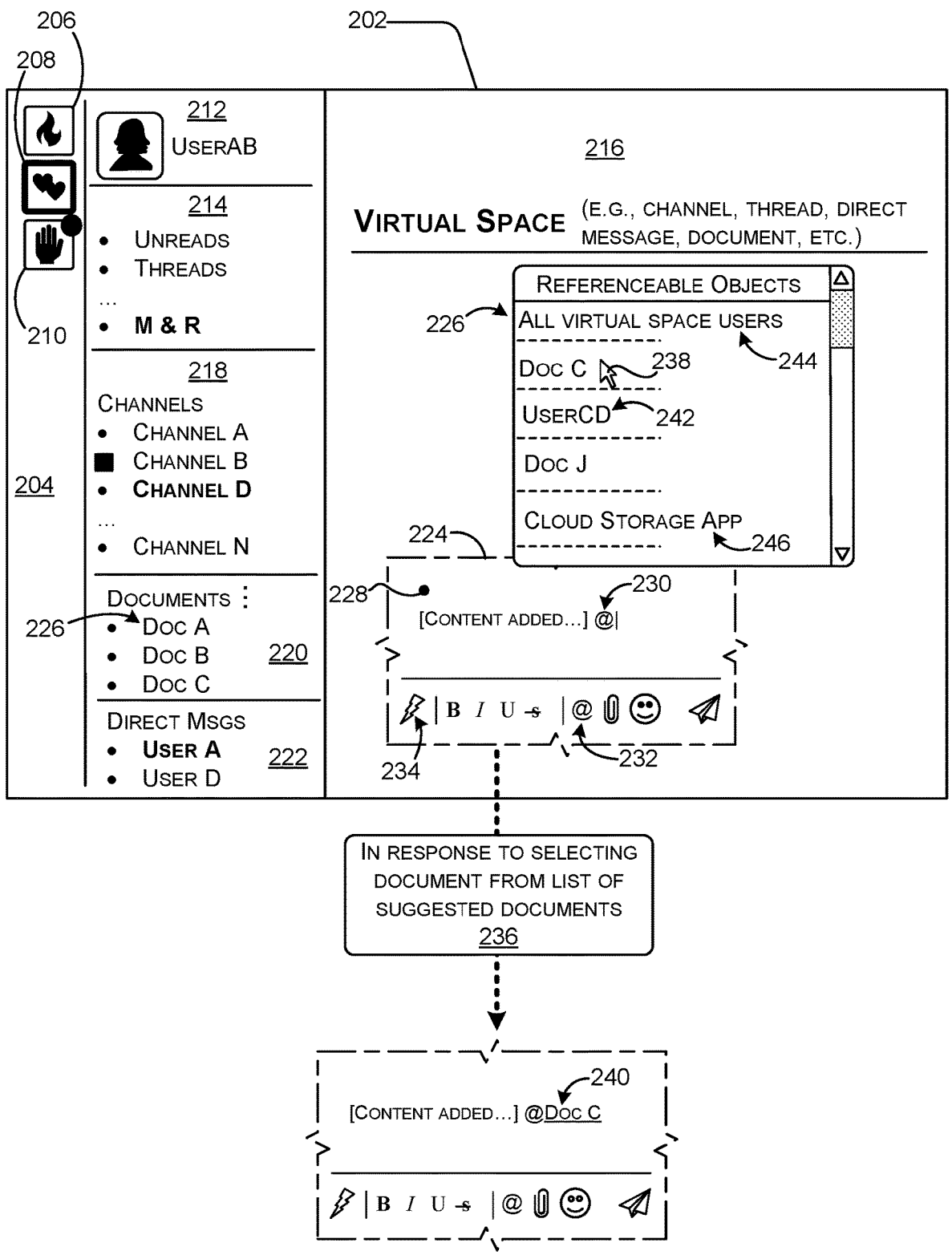
FIG. 2 illustrates an example user interface associated with a communication platform, as described herein, including a suggested objects interface for referencing a document in a virtual space.

Referring to FIG. 2, FIG. 2 illustrates a user interface 202, which may be similar to (or associated with), the user interface 144 described with respect to FIG. 1. As described above, in at least one example, the user interface 144 can include a first section 204 (or pane, portion, or region) that includes indicator(s) (e.g., user interface element(s) or object(s)) of workspace(s) with which the user (e.g., account of the user) is associated. As illustrated in FIG. 2, the user (e.g., UserAB) can be associated with three different workspaces. In some examples, the workspaces can be associated with the same organization (e.g., associated with the same organization identifier). In some examples, one or more of the workspaces can be associated with different organizations (e.g., associated with different organization identifiers). In some examples, one of the workspaces can be associated with users from a single organization (e.g., associated with a same organization identifier) and another of the workspaces can be associated with users from two or more different organizations (e.g., associated with different organization identifiers).

In at least one example, each workspace can be associated with a different indicator 206, 208, and 210, presented via the first section 204. In at least one example, a user account of the user (e.g., UserAB) can be associated with group identifiers that correspond to each of the workspaces (e.g., as determined by the user data 124 and/or the workspace data 128). As such, the user account of the user can be associated with each of the workspaces. A first indicator 206 can represent a first workspace, a second indicator 208 can represent a second workspace, and a third indicator 210 can represent a third workspace.

In some examples, the user can navigate between the workspaces by actuating a control associated with each of the indicators 206, 208, and 210 without needing to log out of one workspace and log in to each of the other workspaces. Non-limiting examples of such indicators, or any indictors described herein, can include icons, symbols, links, tabs, or other user interface elements or objects. In some examples, such indicators can be associated with actuation mechanisms to enable a user to select an indicator and transition to another workspace. In some examples, a visual indicator can indicate which workspace a user is currently interacting with and/or most recently interacted with. For example, the second indicator 208 is outlined in a heavier weight than the first indicator 206 and the third indicator 210, thereby indicating which workspace the user is currently interacting with and/or most recently interacted with. In some examples, the indicators 206, 208, and 210 can be associated with another indicator indicating that the corresponding workspace has been updated. An example is shown with respect to the third indicator 210.

While three indicators 206, 208, and 210 are illustrated in FIG. 2, the user can be associated with any number of workspaces. In some examples, indicators associated with all of the workspaces with which a user is associated can be presented via the first region 204. In some examples, some of the indicators associated with all of the workspaces with which a user is associated can be presented via the first region 204 and the user can interact with the user interface 202 to view additional or alternative indicators. In examples where fewer than all workspaces are represented via the user interface 202, the indicators can be arranged in alphabetical order, in an order of most recent interaction, in an order based on most frequent interaction, or some other order.

In some examples, the first section 204 may not be included in the user interface 202, and such information can be integrated into the user interface 202 via additional or alternative mechanisms.

In some examples, the user interface 202 can include a second section 212, or pane, that includes indicator(s) (e.g., user interface element(s) or object(s)) representing virtual space(s) associated with the workspace(s) with which the user (e.g., account of the user) is associated. In at least one example, the second region 212 can include one or more sub-sections, or sub-panes, which can represent different virtual spaces. For example, a first sub-section 214 can include indicators representing virtual spaces that can aggregate data associated with a plurality of communication channels and/or workspaces. In at least one example, each virtual space can be associated with an indicator in the first sub-section 214. In some examples, an indicator can be associated with an actuation mechanism such that when actuated (e.g., selected), can cause the application 140 to present data associated with the corresponding virtual space via a third region 216. In at least one example, a virtual space can be associated with all unread data associated with each of the workspaces with which the user is associated. That is, in some examples, if the user requests to access the virtual space associated with "unreads," all data that has not been read (e.g., viewed) by the user can be presented in the third section 216, for example in a feed. In such examples, different types of events and/or actions, which can be associated with different communication channels and/or virtual spaces, can be presented via a same feed. In some examples, such data can be organized and/or is sortable by workspace, time, type of action, communication channel, user, or the like. In some examples, such data can be associated with an indication of which user (e.g., member of the communication channel) posted the message and/or performed an action.

In some examples, each virtual space can be associated with a same type of event and/or action. For example, "threads" can be associated with messages, files, etc. posted in threads to messages posted in a communication channel and "mentions and reactions" (e.g., "M & R") can be associated with messages or threads where the user (e.g., UserAB) has been mentioned (e.g., via a tag) or another user has reacted (e.g., via an emoji, reaction, or the like) to a message or thread posted by the user. That is, in some examples, same types of events and/or actions, which can be associated with different communication channels and/or virtual spaces, can be presented via a same feed. As with the "unreads" virtual space, data associated with such virtual spaces can be organized and/or is sortable by workspace, time, type of action, communication channel, user, or the like.

In at least one example, the second portion 212 of the user interface 202 can include a second sub-section 218, or sub-pane, that includes indicators representing communication channels. In some examples, the communication channels can include public channels, private channels, shared channels (e.g., between groups or organizations), single workspace channels, cross-workspace channels, combinations of the foregoing, or the like. In some examples, the communication channels represented can be associated with a single workspace. In some examples, the communication channels represented can be associated with different workspaces (e.g., cross-workspace). In at least one example, if a communication channel is cross-workspace (e.g., associated with different workspaces), the user may be associated with both workspaces, or may only be associated with one of the workspaces. In some examples, the communication channels represented can be associated with combinations of communication channels associated with a single workspace and communication channels associated with different workspaces.

In some examples, the second sub-section 218 can depict all communication channels, or a subset of all communication channels, that the user has permission to access (e.g., as determined by the permission data 126). In such examples, the communication channels can be arranged alphabetically, based on most recent interaction, based on frequency of interactions, based on communication channel type (e.g., public, private, shared, cross-workspace, etc.), based on workspace, in user-designated sections, or the like. In some examples, the second sub-section 218 can depict all communication channels, or a subset of all communication channels, that the user is a member of, and the user can interact with the user interface 202 to browse or view other communication channels that the user is not a member of but are not currently displayed in the second sub-section 218. In some examples, different types of communication channels (e.g., public, private, shared, cross-workspace, etc.) can be in different sections of the second sub-section 218, or can have their own sub-regions or sub-panes in the user interface 202. In some examples, communication channels associated with different workspaces can be in different sections of the second sub-section 218, or can have their own regions or panes in the user interface 202.

In some examples, the indicators can be associated with graphical elements that visually differentiate types of communication channels. For example, Channel B is associated with a square visual element instead of a circle visual element. As a non-limiting example, and for the purpose of this discussion, the square visual element can indicate that the user is not a current member of Channel B, whereas the circle visual element can indicate that the user is a current member of Channels A, D, and N. In some examples, additional or alternative graphical elements can be used to differentiate between public communication channels, private communication channels, shared communication channels, communication channels associated with different workspaces, and the like. In other examples, communication channels that the user is not a current member of may not be displayed in the second sub-section 218 of the user interface 202.

In addition, the second section 212 can include a third sub-section 220, or sub-pane, that can include indicators representative of documents. In some examples, the documents can include public documents (e.g., discoverable by all users associated with a workspace), private documents (e.g., discoverable by only some users associated with a workspace), shared documents (e.g., between groups or organizations), etc. In some examples, the documents represented can be associated with a single workspace. In some examples, the documents represented can be associated with different workspaces (e.g., cross-workspace). In at least one example, if a document is cross-workspace (e.g., associated with different workspaces), the user may be associated with both workspaces, or may only be associated with one of the workspaces. In some examples, the documents represented can be associated with (e.g., linked to) combinations of communication channels associated with a single workspace and communication channels associated with different workspaces.

In some examples, the third sub-section 220 can depict all documents, or a subset of all documents, that the user has permission to access (e.g., as determined by the permission data 126 or documents data). In such examples, the documents can be arranged alphabetically, based on most recent interaction (e.g., creating, viewing, editing, commenting, sharing, etc.), based on frequency of interactions, based on document type (e.g., public, private, shared, cross-workspace, etc.), based on workspace, in user-designated sections, or the like. In some examples, the third sub-section 220 can depict all documents, or a subset of all documents, associated with all virtual spaces that the user is a member of, and the user can interact with the user interface 202 to browse or view documents linked to other virtual spaces that the user is not a member of but are not currently displayed in the second sub-section 220 (e.g., by selecting "browse" in element 154). In some examples, different types of documents (e.g., public, private, shared, cross-workspace, etc.) can be in different sections of the third sub-section 220, or can have their own sub-regions or sub-panes in the user interface 202. In some examples, documents associated with different workspaces can be in different sections of the third sub-section 220, or can have their own section or panes in the user interface 202.

In addition, the second section 212 can include a fourth sub-section 222, or sub-pane, that can include indicators representative of communications with individual users or multiple specified users (e.g., instead of all, or a subset of, members of an organization). Such communications can be referred to as "direct messages." That is, the fourth sub-section 222, or sub-pane, can include indicators representative of virtual spaces that are associated with private messages between one or more users.

In examples, various information can be presented in the third section 216. As explained with respect to user interface 144, the third section 216 can present information associated with a virtual space, channel, thread, direct message, document, and the like. In some examples, a composition interface element 224 can be presented in the third section 216, such as to facilitate the user (e.g., UserAB) composing content and sharing the content to one or more other users (e.g., one or more other users associated with a channel, thread, direct message, document, or other virtual space). That is, the composition interface element 224 could be presented in association with a user composing a new message (e.g., direct message, channel post, message reply, etc.) to one or more other users, composing content in a document, commenting in a document, and the like. The message composition interface element 224 is outlined in broken lines to indicate that it could be presented at various positions relative to the interface 202 and/or the third section 216.

As indicated in other portions of this disclosure, a user may invoke a list 226 of suggested documents (e.g., scrollable list of "referenceable objects") to reference in the composition portion 228 of the interface element 224. For example, the user may invoke the list 226 via a keyboard shortcut (e.g., typing "@" 230), the interface element 232, and/or the shortcuts interface element 234. In some examples, the list 226 may be presented in a pop-up window or in an overflow pane. The list 226 may be identified from various sources, and in some examples, the list 226 is identified from local objects (e.g., all local objects and/or a variety of different types of local objects) associated with the communication application 140.

In response to the request (e.g., receiving the list-invoking user input), examples of the present disclosure can identify one or more documents (e.g., "Doc C" and "Doc J" in FIG. 2) to be presented in the list 226. The one or more documents can be identified using various techniques, such as by identifying one or more attributes associated with a user and/or virtual space, and determining, based on the one or more attributes, whether a condition is satisfied. Examples of the present disclosure can identify various attributes and assess various conditions in manners that result in the identification of relevant documents for inclusion in the list 226 of suggested documents. In some examples, an attribute may include a user preference (e.g., preference for a document, other user, or virtual space as indicated by a preferred status or otherwise identified as important). In some examples, an attribute may include recent user activity with respect to one or more document(s) (e.g., viewed, edited, commented, shared, etc.); one or more virtual spaces (e.g., virtual spaces the user recently visited or shared content with, combinations of virtual spaces visited by a user or that the user is associated with); and/or one or more users. In some examples, an attribute may include tags or keywords associated with a user or a virtual space. In some examples, an attribute may include content associated with a document, such as the presence or absence of images, video, audio, charts, spreadsheets, links to other documents, and the like.

In addition, various conditions may be used to help identify relevant documents. In some examples, a condition may include a document being associated with a preferred status, such as where a user has designated the preferred status or the document is associated with another user or virtual space designated with the preferred status. In some examples, the condition can include the user having interacted with the document within a threshold time (e.g., within the past 7 days) and/or as one of a threshold number of documents most recently interacted with (e.g., one of the ten most recently interacted with documents). In some examples, the condition may include the user's past interaction with the document satisfying some interaction-level threshold (e.g., open on a user computing device for at least 1 minute; one or more edits made to the document by the user; etc.). In some examples, the condition can include learned conditions such as time of accessing documents (e.g., if documents are accessed, edited, viewed, or otherwise interacted with on a regular or learned schedule(s)). These are just some examples of attributes and conditions that may be considered, and in some examples, other attributes and conditions be used to identify documents.

In some examples, a document from the list 226 may be selected 236, and in FIG. 2, a selection is illustrated in FIG. 2 by the cursor arrow 238 (e.g., could be a mouse click, keyboard entry, touch input, gesture, audio command, etc.). In addition, based on the selection 236, a link 240 to the document can be added to the composition interface element 224.

As indicated, in some examples, when identifying the list 226, the documents application 141 (or some other functionally similar component) can reference a list of local objects (e.g., all local objects maintained by the local objects manager 143) and identify the list of suggested documents from the list of local objects. For example, a list of local objects can be maintained in association with the communication application 140, including data associated with the objects, such as data used to identify attributes. Examples of objects can include user accounts (e.g., UserCD); groups of user accounts (e.g., all users of a virtual space or all active users of a virtual space); virtual spaces (e.g., direct messages, chats, channels, etc.); lists; calendar items; workflows; applications linked to the communication application (e.g., third-party applications, such as a cloud storage application or video conferencing application; and the like. In some examples, the mechanism that can be used to invoke the list of suggested documents can also be used to invoke other types of objects, such as a link to UserCD 242, a link to All Virtual Space Users 244, and a link to Cloud Storage App 246. That is, the same mechanism may be used to invoke various different types of object that can be referenced in the virtual space. In some examples, the list of objects includes only a list of suggested documents.

In some examples, techniques described herein can rank the different types of objects based on a same or different condition, criteria, and/or attribute, and present the list 226 of varied object types in a sorted order. As such, the list of varied object types can include a document (e.g., Doc C) interleaved among one or more different object types (e.g., between user accounts in the list or between a user account and some other type of referenceable object type). By ranking the different types of objects, examples of the present disclosure can enable efficient use of a single invoking mechanism (e.g., a keyboard shortcut, such as "@" or "*"), instead of needing a different invoking mechanism for the different types of objects.

Figure 3:
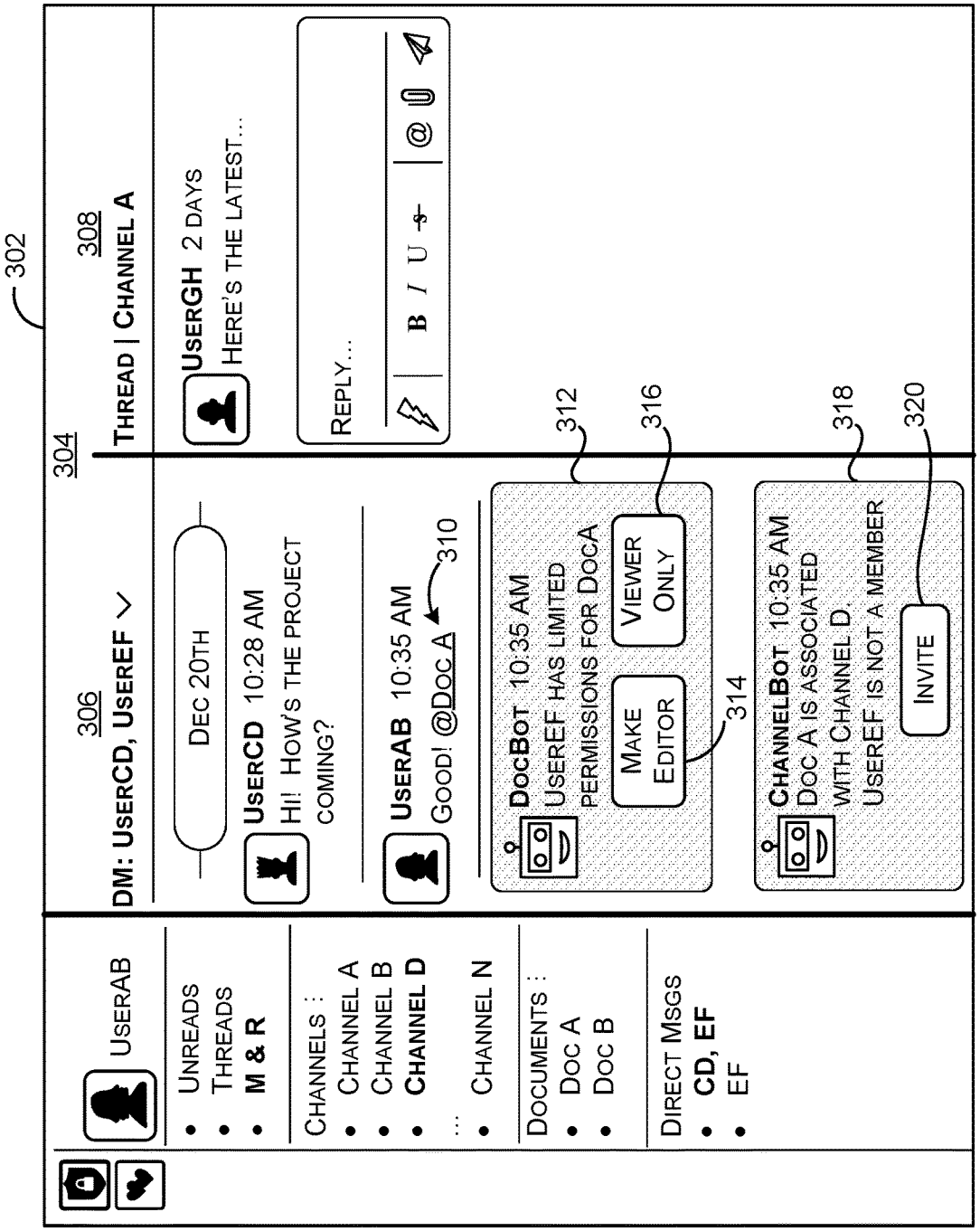
FIG. 3 illustrates an example user interface associated with a communications platform, as described herein, wherein automated messages can be provided to improve user access and collaboration to shared documents.

Referring now to FIG. 3, FIG. 3 depicts an example user interface in accordance with examples of the present disclosure. In accordance with some examples, the user interface 302 includes a user interface section 304 with a first sub-section 306 and a second sub-section 308. The first sub-section 306 depicts a message thread associated with a direct message exchange between UserAB, UserCD, and UserEF, the second sub-section 308 depicts an exchange as part of a messaging thread that is between UserAB and UserGH and that is associated with Channel A.

In some examples, permissions (e.g., in relation to a document) of one or more users may be identified. For example, permissions may be identified when a document is identified for inclusion in a list of suggested documents to be referenced in a virtual space. In addition, permissions may be identified when a document is selected to be referenced in a virtual space. For example, as indicated by the referenced-doc indicator 310, UserAB has referenced "Doc A" in a message that is posted to the direct message exchange between UserAB, UserCD, and UserEF. In some examples, techniques of the present disclosure can determine what level of permissions are associated with a user (e.g., UserEF), which has access to the virtual space (e.g., direct message thread) in which the document (e.g., Doc A) is referenced. For example, the documents manager 116 (e.g., FIG. 1), communication application 140, and/or the documents application 141 may maintain a list of permissions associated with a document and track with which users the document has been shared. As such, when a document is shared with one or more users, a lookup (or other operation) may be performed to determine what permissions are associated with a user with whom the document has been shared. For example, the documents manager 116, communication application 140, and/or documents application 141 may perform the lookup and communicate the permissions to one or more other components. In some examples, techniques of the present disclosure may identify one or more limited permissions associated with a user (e.g., no access, view only, etc.). In addition, in some examples an automated message 312 may be generated (e.g., by the documents manager 116, the VS management component 118, the communication application 140, the documents application, or some other similar component) and rendered, for display, in the user interface 302. Among other things, the automated message 312 may indicate that the user (e.g., UserEF) has limited permission with respect to the document (e.g., Doc A) referenced in the prior message and provide one or more affordances 314 and 316 to affect the permissions (e.g., enable editing, viewing only, etc.). These examples can, among other things, improve collaborative workflow and computing efficiency by more quickly notifying a first user when a second user has limited permissions with the respect to a shared document and reducing the likelihood that the users may need to exchange back and forth messages to enable the second user to gain desired permissions.

In some examples, virtual-space membership (e.g., in relation to a document) of one or more users may be identified. That is, in some examples, a document may be linked to or otherwise associated with a virtual space, such as a channel or some other virtual space other than the direct message virtual space associated with UserAB, UserCD, and UserEF. As such, examples of the present disclosure can, when a document that is associated with a virtual space is shared with a user, determine whether the user is a member of the virtual space. For example, as indicated by the referenced-doc indicator 310, UserAB has referenced "Doc A" in a message that is posted to the direct message exchange between UserAB, UserCD, and UserEF. In some examples, the Doc A can be a document of, or otherwise associated with, a virtual space (e.g., "Channel D"). As such, techniques of the present disclosure can determine whether a user with whom the document has been shared is a member of the virtual space. For example, the documents manager 116 (e.g., FIG. 1), the VS management component 118, the communication application 140, and/or the documents application 141 may maintain a list of one or more documents associated with each virtual space, as well as a list users that have joined the virtual space (e.g., members of the virtual space). As such, when a document is shared with one or more users, a lookup (or other operation) may be performed to determine what virtual space(s) is/are associated with the document and whether users with whom the document has been shared are members of the virtual space. For example, the documents manager 116, the VS management component, the communication application 140, and/or documents application 141 may perform the lookup and communicate the permissions to one or more other components.

In some examples, techniques of the present disclosure may, when a document is shared with a user, determine the user is not a member of a virtual space associated with the document. In addition, in some examples an automated message 318 may be generated (e.g., by the documents manager 116, the VS management component 118, the communication application 140, the documents application 141, or some other similar component) and rendered, for display, in the user interface 302. Among other things, the automated message 318 may indicate that the user (e.g., UserEF) is not a member of a virtual space (e.g., Channel D) associated with the document (e.g., Doc A) and provide an affordance 320 that, when selected, can trigger an invitation to the user to join the virtual space. These examples can be useful in various contexts, such as where the virtual space is private (e.g., only members can discover the virtual space and see content) and the virtual space includes content and sharing opportunities relevant to the shared document. Further, even when the virtual space is public, facilitating channel membership (e.g., of the UserEF) can help increase the likelihood that the user receives notifications relevant to the virtual space (e.g., now that the user is a member).

In some examples, permissions associated with a document can be based at least in part on features associated with a creation of the document. For example, if a document is created by an application within a group-based communication platform (also referred to as a group-based communication system), an application separate from a group-based communication platform, as a channel post, a synchronous audio call, a workspace, or the like, permissions can be based on permissions associated with the creation method. In other words, if a document is created in a synchronous audio call, the document permissions can be based on users that originally had access to the synchronous audio call. In some examples, if the document is created using a particular method and shared to another group of users (which may include some or all of the users associated with the creation method), the document permissions can be based on the group of users to which the document was subsequently shared. In some examples, permissions can be created by combining method(s) and/or techniques discussed herein.

In FIG. 3, the automated messages 312 and 318 are depicted in the context of a direct message example. In other examples, automated messages associated with limited document permissions and/or virtual-space membership can be presented in association with other virtual spaces, such as threads or channels (e.g., presented in the sub-section 308). For example, a first user (e.g., UserAB) can, in the depicted thread of Channel A, reference a document (e.g., DocA) associated with a virtual space (e.g., Channel D), and a second user (e.g., UserGH) might have limited permission with respect to the document and/or might not be a member of a virtual space associated with the referenced document. As such, similar automated messages could be presented in association with sharing a document in a channel or other virtual space, as depicted and discussed with respect to messages 312 and 318.

Figure 4:
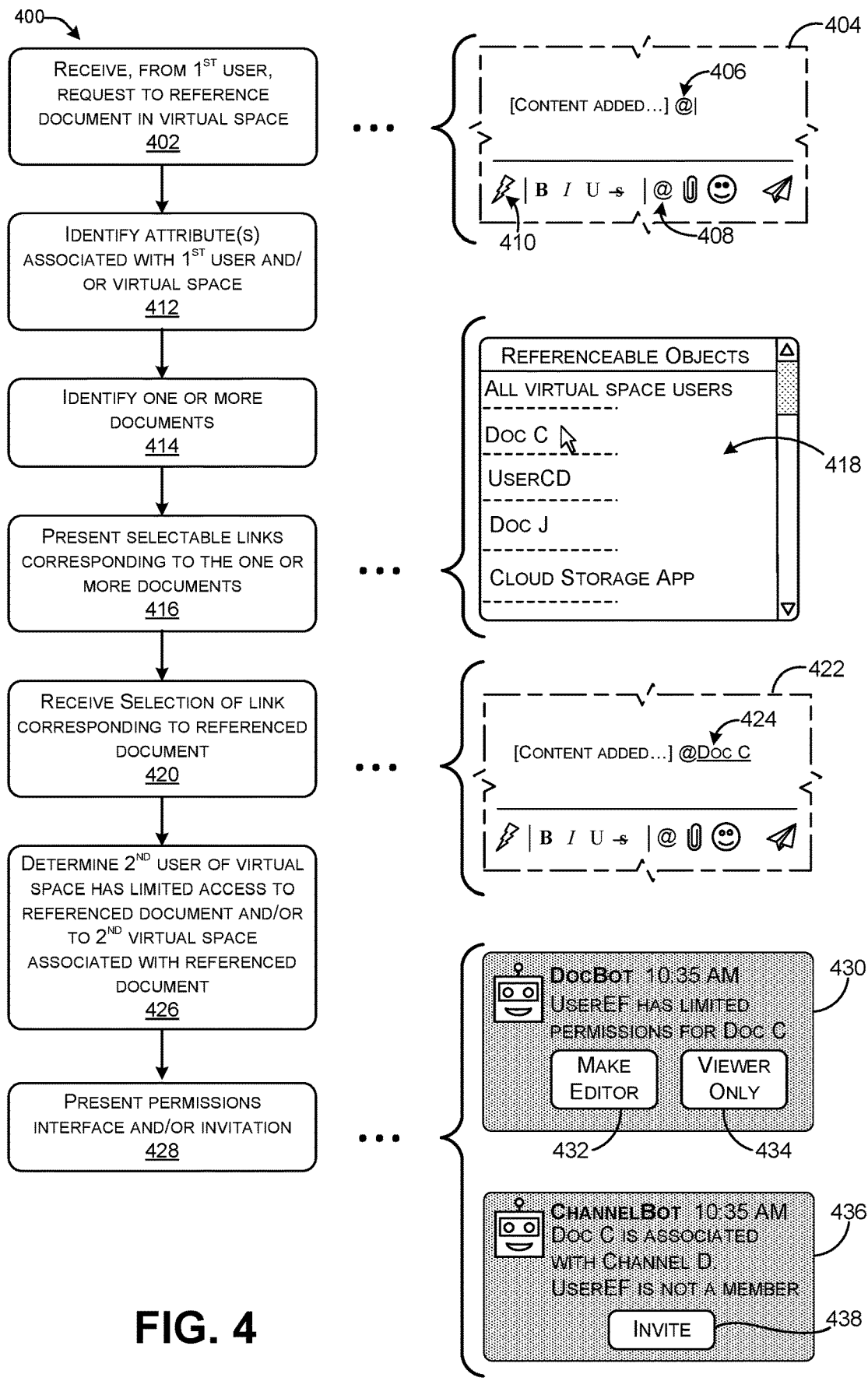
FIG. 4 illustrates an example process for referencing a document in a virtual space, as described herein.

Referring to FIG. 4, an example process 400 is illustrated for providing a list of suggested documents that are referenceable in a virtual space. In some instances, some or all of process 400 may be performed by one or more components in the environment 100 or one or more components discussed with respect to FIGS. 2 and/or 3. However, the process 400 is not limited to being performed by components in the environment 100, and the components in the environment 100 are not limited to performing the processes 400. In addition, example user interfaces are also provided in FIG. 4 to help illustrate elements, and the process 400 is not limited to the aspects shown in the user interfaces.

Referring to FIG. 4, in at least some examples, at operation 402, the process 400 includes receiving, from a user (e.g., first user), a request to reference a document in a virtual space. For example, the request can include, in association with a composition user interface 404, the first user inputting a keyboard shortcut "@" 406, selecting a request icon 408, or selecting a shortcuts icon 410.

In some examples, at operation 412, the process 400 can include identifying an attribute associated with one or more of the user or the virtual space. Examples of attributes can include interactions (e.g., visiting, editing, sharing, messaging, etc.) of the first user with a document or a virtual space. In some instances, an attribute may include a keyword, tag, etc. associated with both the virtual space and the document.

The process includes, at operation 414, identifying, based at least in part on a condition being satisfied by the attribute, one or more documents.

In some examples, at operation 416, the process can include rendering, for presentation via a display, one or more selectable links corresponding to the one or more documents. For example, the list 418 of links can be presented, including links to one or more documents, as well as links to one or more other local objects (e.g., other user, groups of users, linked applications, etc.).

In addition, in one or more examples, the process 400 can include, at operation 420, receiving a selection of a link corresponding to a referenced document. For example, "Doc C" in the list 418 could be selected, such as vias a mouse click, keyboard return key, or other input. Further, as depicted in the interface element 422, a link 424 to Doc C has been added.

In one or more examples, the process 400 can include, at operation 426, determining that a second user of the virtual space (e.g., in which Doc C has been shared) has limited access to the referenced document and/or has limited access to another virtual space associated with the referenced document (e.g., no access to the other virtual space, not a member of the other virtual space, not subscribed to notifications associated with the other virtual space, etc.). For example, operation 426 can include determining the second user is not a member of the second virtual space, which can restrict discoverability and access (e.g., for private virtual spaces) and can prevent the second user from receiving relevant notifications associated with the second virtual space (e.g., for both public and private virtual spaces).

In examples, the process 400 can include, at operation 428, presenting a permissions interface element indicating the second user has limited permissions with respect to the referenced document. In some examples, operation 428 can include presenting an affordance that, when selected, modifies permissions of the second user with respect to the referenced document. For example, the process 400 can include presenting the interface element 430 with one or more of the affordances 432 or 434. In some examples, the process 400 can include, at operation 428, presenting an affordance that, when selected, invites the second user to join the second virtual space. For example, the interface element 436 can be presented with the affordance 438 that, when selected, can invite the UserEF to join the Channel D.

The operations described with respect to the process 400 provide one or more examples of the present disclosure. In some examples, all of the operations may not be performed. For example, in some instances, the process 400 may include only operations 402, 412, 414, and 416, or any other combination of operations.

EXAMPLE CLAUSES

A. A method comprising: receiving, from a user, a request to reference a document in a virtual space associated with a group-based communication system; identifying an attribute associated with one or more of the user or the virtual space; identifying, based at least in part on a condition being satisfied by the attribute, one or more documents; and rendering, for presentation via a display, one or more selectable links corresponding to the one or more documents.

B: The method of paragraph A, wherein the attribute is based on an interaction of the user with one or more of the one or more documents or a second virtual space associated with the one or more documents.

C: The method of paragraph A or B, wherein the attribute is based on one or more of a keyword or a tag associated with both the virtual space and the one or more documents.

D: The method of any of paragraphs A-C, further comprising: receiving a selection of a link that is included in the one or more selectable links and that corresponds to a referenced document; and rendering, for presentation via a display, the document within the group-based communication system.

E: The method of any of paragraphs A-D, further comprising: determining that the user is interacting with a link that is included in the one or more selectable links and that corresponds to a referenced document; and rendering, for presentation via a display and based at least in part on one or more permissions associated with the user, at least a portion of the referenced document as a preview within the group-based communication system.

F: The method of any of paragraphs A-E, further comprising: receiving a selection of a link that is included in the one or more selectable links and that corresponds to a referenced document; identifying a second virtual space associated with the referenced document; determining a second user profile of the virtual space is not a member of the second virtual space; and rendering, for presentation via the display, an affordance that, when selected, invites the second user profile to join the second virtual space.

G. The method of any of paragraphs A-F, wherein: the request to reference the document includes a user input that is usable to request both the one or more documents and one or more other local objects that are referenceable in the virtual space; and the method further comprises ranking, based at least in part on the attribute, the one or more documents and the one or more other local objects.

H. A system comprising: one or more processors; and one or more non-transitory computer-readable media storing instructions that, when executed, cause the system to: receive, from a user, a request to reference a document in a virtual space associated with a group-based communication system; identify an attribute associated with one or more of the user or the virtual space; identify, based at least in part on a condition being satisfied by the attribute, one or more documents; and render, for presentation via a display, one or more selectable links corresponding to the one or more documents.

I: The system of paragraph H, wherein the attribute is based on an interaction of the user with one or more of the one or more documents or a second virtual space associated with the one or more documents.

J: The system of paragraph H or I, wherein the attribute is based on one or more of a keyword or a tag associated with both the virtual space and the one or more documents.

K: The system of any of paragraphs H-J, wherein the instructions further cause the system to: receive a selection of a link that is included in the one or more selectable links and that corresponds to a referenced document; and render, for presentation via a display, the document within the group-based communication system.

L: The system of any of paragraphs H-K, wherein the instructions further cause the system to: determine that the user is interacting with a link that is included in the one or more selectable links and that corresponds to a referenced document; and render, for presentation via a display and based at least in part on one or more permissions associated with the user, at least a portion of the referenced document as a preview within the group-based communication system.

M: The system of any of paragraphs H-L, wherein the instructions further cause the system to: receive a selection of a link that is included in the one or more selectable links and that corresponds to a referenced document; identify a second virtual space associated with the referenced document; determine a second user profile of the virtual space is not a member of the second virtual space; and render, for presentation via the display, an affordance that, when selected, invites the second user profile to join the second virtual space.

N. The system of any of paragraphs H-M, wherein: the request to reference the document includes a user input that is usable to request both the one or more documents and one or more other local objects that are referenceable in the virtual space; and the instructions further cause the system to rank, based at least in part on the attribute, the one or more documents and the one or more other local objects.

O. One or more non-transitory computer-readable media storing instructions that, when executed, cause one or more processors to: receive, from a user, a request to reference a document in a virtual space associated with a group-based communication system; identify an attribute associated with one or more of the user or the virtual space; identify, based at least in part on a condition being satisfied by the attribute, one or more documents; and render, for presentation via a display, one or more selectable links corresponding to the one or more documents.

P: The one or more non-transitory computer-readable media of paragraph O, wherein the attribute is based on an interaction of the user with one or more of the one or more documents or a second virtual space associated with the one or more documents.

Q: The one or more non-transitory computer-readable media of paragraph O or P, wherein the attribute is based on one or more of a keyword or a tag associated with both the virtual space and the one or more documents.

R: The one or more non-transitory computer-readable media of any of paragraphs O-Q, wherein the instructions further cause the one or more processors to: receive a selection of a link that is included in the one or more selectable links and that corresponds to a referenced document; and render, for presentation via a display, the document within the group-based communication system.

S: The one or more non-transitory computer-readable media of any of paragraphs O-R, wherein the instructions further cause the one or more processors to: determine that the user is interacting with a link that is included in the one or more selectable links and that corresponds to a referenced document; and render, for presentation via a display and based at least in part on one or more permissions associated with the user, at least a portion of the referenced document as a preview within the group-based communication system.

T: The one or more non-transitory computer-readable media of any of paragraphs O-S, wherein the instructions further cause the one or more processors to: receive a selection of a link that is included in the one or more selectable links and that corresponds to a referenced document; identify a second virtual space associated with the referenced document; determine a second user profile of the virtual space is not a member of the second virtual space; and render, for presentation via the display, an affordance that, when selected, invites the second user profile to join the second virtual space.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

What is claimed is:

1. A method comprising:
receiving, from a user associated with a first user profile, a request to link a document in a first virtual space associated with a group-based communication system, wherein the first virtual space comprises a communication channel or a first direct messaging instance;
identifying an attribute associated with one or more of the user or the first virtual space;
identifying, based at least in part on a condition being satisfied by the attribute, one or more suggested documents;
rendering, for presentation via a display of a computing device associated with the first user profile, a list of one or more selectable links corresponding to the one or more suggested document, the list being displayed within the communication channel or the first direct messaging instance;
receiving a selection of a link that is included in the list of one or more selectable links and that corresponds to a suggested document of the one or more suggested document;
identifying, based at least in part on the selection of the link, a second virtual space associated with the suggested document, wherein the second virtual space is a second direct messaging instance that is different than the first direct messaging instance;
determining, based at least in part on the second virtual space being associated with the suggested document, that a second user profile is not a member of the second virtual space; and
generating, based at least in part on the second user profile not being a member of the second virtual space, an invitation for the second user profile to join the second virtual space.

2. The method of claim 1, wherein the attribute is based on an interaction of the user with one or more of the one or more suggested documents or the second virtual space associated with the one or more suggested documents.

3. The method of claim 1, wherein the attribute is based on one or more of a keyword or a tag associated with both the first virtual space and the one or more suggested documents.

4. The method of claim 1, further comprising:
rendering, for presentation via the display, the suggested document within the group-based communication system.

5. The method of claim 1, further comprising:
rendering, for presentation via the display and based at least in part on one or more permissions associated with the user, at least a portion of the suggested document as a preview within the group-based communication system.

6. The method of claim 1, further comprising:
rendering, for presentation via the display, an affordance that, when selected, sends the invitation to the second user profile to join the second virtual space.

7. The method of claim 1, wherein:
the request to link the document includes a user input that is usable to request both the one or more suggested documents and one or more other local objects that are referenceable in the first virtual space; and
the method further comprises ranking, based at least in part on the attribute, the one or more suggested documents and the one or more other local objects.

8. A system comprising:
one or more processors; and
one or more non-transitory computer-readable media storing instructions that, when executed, cause the system to:
receive, from a user associated with a first user profile, a request to link a document in a first virtual space associated with a group-based communication system, wherein the first virtual space comprises a communication channel or a first direct messaging instance;
identify an attribute associated with one or more of the user or the first virtual space;
identify, based at least in part on a condition being satisfied by the attribute, one or more suggested documents;
render, for presentation via a display of a computing device associated with the first user profile, a list of one or more selectable links corresponding to the one or more suggested documents, the list being displayed within the communication channel or the first direct messaging instance;
receiving a selection of a link that is included in the list of one or more selectable links and that corresponds to a suggested document of the one or more suggested documents;
identifying, based at least in part on the selection of the link, a second virtual space associated with the suggested document, wherein the second virtual space is a second direct messaging instance that is different than the first direct messaging instance;
determining, based at least in part on the second virtual space being associated with the suggested document, that a second user profile is not a member of the second virtual space; and
generating, based at least in part on the second user profile not being a member of the second virtual space, an invitation for the second user profile to join the second virtual space.

9. The system of claim 8, wherein the attribute is based on an interaction of the user with one or more of the one or more suggested documents or the second virtual space associated with the one or more suggested documents.

10. The system of claim 8, wherein the instructions further cause the system to:
render, for presentation via the display, the suggested document within the group-based communication system.

11. The system of claim 8, wherein the instructions further cause the system to:
render, for presentation via the display and based at least in part on one or more permissions associated with the user, at least a portion of the suggested document as a preview within the group-based communication system.

12. The system of claim 8, wherein the instructions further cause the system to:
render, for presentation via the display, an affordance that, when selected, sends the invitation to the second user profile to join the second virtual space.

13. The system of claim 8, wherein:
the request to link the document includes a user input that is usable to request both the one or more suggested documents and one or more other local objects that are referenceable in the first virtual space.

14. One or more non-transitory computer-readable media storing instructions that, when executed, cause one or more processors to:
- receive, from a user associated with a first user profile, a request to link a document in a first virtual space associated with a group-based communication system, wherein the first virtual space comprises a communication channel or a first direct messaging instance;
- identify an attribute associated with one or more of the user or the first virtual space;
- identify, based at least in part on a condition being satisfied by the attribute, one or more suggested documents;
- render, for presentation via a display of a computing device associated with the first user profile, a list of one or more selectable links corresponding to the one or more suggested documents, the list being displayed within the communication channel or the first direct messaging instance;
- receiving a selection of a link that is included in the list of one or more selectable links and that corresponds to a suggested document of the one or more suggested documents;
- identifying, based at least in part on the selection of the link, a second virtual space associated with the suggested document, wherein the second virtual space is a second direct messaging instance that is different than the first direct messaging instance;
- determining, based at least in part on the second virtual space being associated with the suggested document, that a second user profile is not a member of the second virtual space; and
- generating, based at least in part on the second user profile not being a member of the second virtual space, an invitation for the second user profile to join the second virtual space.

15. The one or more non-transitory computer-readable media of claim 14, wherein the attribute is based on an interaction of the user with one or more of the one or more suggested documents or the second virtual space associated with the one or more suggested documents.

16. The one or more non-transitory computer-readable media of claim 14, wherein the attribute is based on one or more of a keyword or a tag associated with both the first virtual space and the one or more suggested documents.

17. The one or more non-transitory computer-readable media of claim 14, wherein the instructions further cause the one or more processors to:
- render, for presentation via a display, the suggested document within the group-based communication system.

18. The one or more non-transitory computer-readable media of claim 14, wherein the instructions further cause the one or more processors to:
- render, for presentation via a display and based at least in part on one or more permissions associated with the user, at least a portion of the suggested document as a preview within the group-based communication system.

19. The one or more non-transitory computer-readable media of claim 14, wherein the instructions further cause the one or more processors to:
- render, for presentation via the display, an affordance that, when selected, sends the invitation to the second user profile to join the second virtual space.

20. The system of claim 8, wherein the instructions further cause the system to:
- rank, based at least in part on the attribute, the one or more suggested documents.

* * * * *